United States Patent [19]

Takanashi et al.

[11] Patent Number: 5,091,277
[45] Date of Patent: Feb. 25, 1992

[54] METHOD FOR RECORDING/REPRODUCING CHARGE IMAGE

[75] Inventors: Itsuo Takanashi, Kamakura; Shintaro Nakagaki, Fujisawa; Tsutou Asakura, Yokohama; Masato Furuya; Tetsuji Suzuki, both of Yokosuka, all of Japan

[73] Assignee: Victor Company of Japan, Yokohama, Japan

[21] Appl. No.: 548,077

[22] Filed: Jul. 5, 1990

[30] Foreign Application Priority Data

Jul. 5, 1989 [JP] Japan .................................. 1-173673
Jul. 5, 1989 [JP] Japan .................................. 1-173674

[51] Int. Cl.$^5$ .............................................. G03G 13/18
[52] U.S. Cl. ......................................... 430/48; 358/75; 346/108
[58] Field of Search ........................... 430/48; 358/75; 346/108

[56] References Cited

U.S. PATENT DOCUMENTS 4,229,095 10/1980 Mir ............................................. 430/42
4,282,297 8/1981 Fotland ....................................... 430/48
4,628,017 12/1986 Tagoku et al. ............................. 430/48

FOREIGN PATENT DOCUMENTS 239062 2/1990 Japan .

Primary Examiner—John Goodrow
Attorney, Agent, or Firm—Michael N. Meller

[57] ABSTRACT

There is provided a method for transferring a charge image wherein the charge image is formed on a surface of the master recording medium and a reproduction member is brought to contact with the surface of the master recording medium, the reproduction member being a laminated structure of photomodulation layer and electrode layer, thereby the charge image formed on the surface of the master recording medium is transferred to a surface of the photomodulation layer of the reproduction member. Further the charge is formed on a surface of the master recording medium, a reproduction member is brought to confront with the surface of the master recording medium across a gap, the reproduction member being a laminated structure of photomodulation layer and electrode layer and a space discharge is caused across the gap thereby the charge image formed on the surface of the master recording medium is transferred across the gap to a surface of the photomodulation layer of the reproduction member.

10 Claims, 8 Drawing Sheets

METHOD FOR RECORDING/REPRODUCING CHARGE IMAGE

This invention relates to a method for transferring a charge image.

In compliance with an increased demand for recording various signals with high resolution in recent years; as well known, high density recording/reproduction systems employing recording media composed based on various structural or operational principles have been proposed.

Several types of recording media such as pit-formation type, bubble- or irregularity-formation type, magneto-optical type, relative-change type (heat-transformation type in which transmittance, reflectance or absorptance of light is changed due to heat energy) and other recording media using energy other than light for recording/reproduction also have been proposed.

However, such high density recording/reproduction systems have complex and bulky structure.

Furthermore, there is also provided an erasable recording medium. If magnetic type, erasing is easy but there is a problem in high density recording. If an optical disk, high density recording is easy but erasing cannot be done with simple means.

In order to solve such problems, the assignee of this application has already proposed a system as shown in FIG. 1 for reproducing a charge image from a recording medium situated in a recording medium as shown in FIG. 2.

FIG. 2 shows a recording medium 10 provided with a charge holding layer (hereinafter abbreviated in a CHL) member 12 (a recording member) of a material with high resistance such as silicon resin which can hold a charge image for a long time at least with the help of an electrode 14 (a recording electrode).

The charge image is recorded as follows. An electric field is generated across the electrode 14 and a transparent electrode 18 of a writing head 16 by applying a voltage thereacross from a d.c. power supply 24. A light carrying an optical image of an object O is projected onto a photoconductive layer (hereinafter abbreviated in a PCL) member 20 of the writing head 16 through an imaging lens 22 and the transparent electrode 18. The resistance value of the PCL member 20 decreases with an increase of intensity distribution of the optical image to generate a space discharge across a gap between the PCL member 20 and the CHL member 12. The charge image corresponding to the optical image is therefore formed on the CHL member 12.

Next, the charge image thus formed is reproduced by the system shown in FIG. 1. A reading head 26 in the system is composed by laminating a transparent electrode 30 (a reading electrode) and a photo-modulation layer (hereinafter abbreviated in a PML) member 28 composed of such as monocrystal of lithium niobate which changes plane of polarization of light passing therethrough with the help of electric field generated by the charge image formed on the CHL member 12 of the recording medium 10.

A laser beam (a bundle of electro-magnetic radiation rays) radiated from a laser source 32 (a source of an electro-magnetic radiation rays for reproduction) and deflected in X and Y directions depicted by arrows by an optical system and deflection system not shown is incident to the recording medium 10 through the PML member 28. The plane of polarization of the laser beam therefore varys accordingly with the charge image.

After passing through the recording medium 10, the laser beam is applied to a photoelecric convertor 38 through a analyzer 34 and a lens 36. The photoelecric convertor 38 produces electric signals corresponding to the optical image recorded in the recording medium 10 as the charge image.

The system described above has been applied to such as an imaging apparatus, a printer and a displaying apparatus. However in the system, the photoelecric convertor 38 cannot produce the electric signals with high resolution if the electric field generated by the charge image is not properly applied to the PML member 28.

As is shown in FIG. 1, if there is a gap d across the CHL member 12 and the PML member 28, the electric field is spread at the gap and applied thereto. This results in the charge image read by the reading head 26 being degraded compared to that formed on the CHL member 12.

The gap d may be narrowed in order to solve such problem. However, it is very difficult to form uniform narrow gap and irregularity of the thickness of the PML member 28 damages the electric signals to be produced.

Furthermore, there is sometimes a need to duplicate the recording medium in which the charge image is preliminary formed. However, when the charge image prerecorded in a master recording medium is transferred to another recording medium, the charge image on the master is destroyed so that large number of duplication cannot be produced.

SUMMARY OF THE INVENTION

An object of the present invention is to provide a method for transferring a charge image in which a charge image prerecorded in a master recording medium is transferred to a reproduction member including a photo-modulation layer member and is reproduced by radiating an electro-magnetic radiation beam to the reproduction member.

In carrying out the present invention, in one preferred mode, we utilize the method for transferring a charge image, comprising steps of:

forming the charge image on a surface of the master recording medium; and bringing a reproduction member to contact with the surface of the master recording medium, the reproduction member being a laminated structure of photomodulation layer and electrode layer, thereby the charge image formed on the surface of the master recording medium is transferred to a surface of the photomodulation layer of the reproduction member.

Further the method comprises steps of:

forming the charge on a surface of the master recording medium;

bringing a reproduction member to confront with the surface of the master recording medium across a gap, the reproduction member being a laminated structure of photomodulation layer and electrode layer; and causing a space discharge across the gap thereby the charge image formed on the surface of the master recording medium is transferred across the gap to a surface of the photomodulation layer of the reproduction member.

Other objects and advantages of the present invention will become apparant from the detailed description to follow taken in conjunction with the appended claims.

DESCRIPTION OF THE PREFERRED EMBODIMENTS

Figure 1:
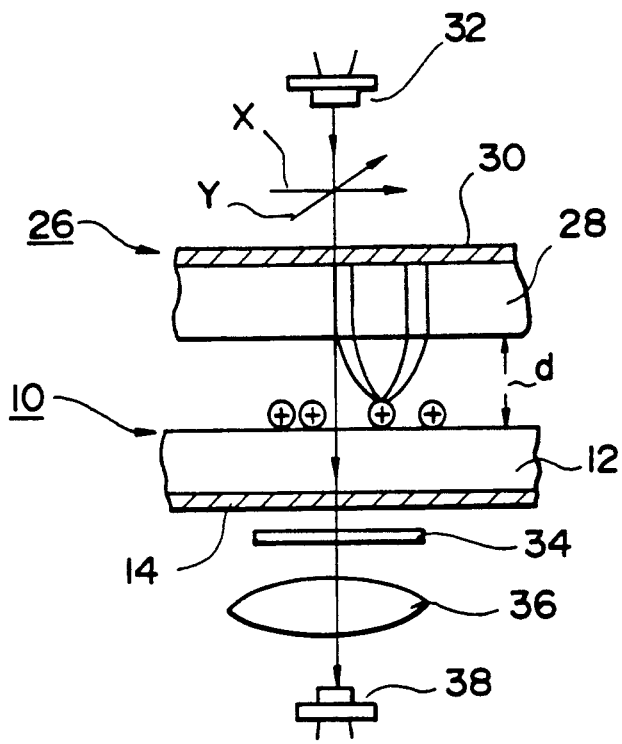
FIG. 1 is a block diagram showing a conventional reproduction system.

The present invention will now be described with reference to the accompanying drawings.

Throughout the drawings, like reference numerals and letters are used to designate like or equivalent elements for the sake of simplicity of explanation.

Figure 3:
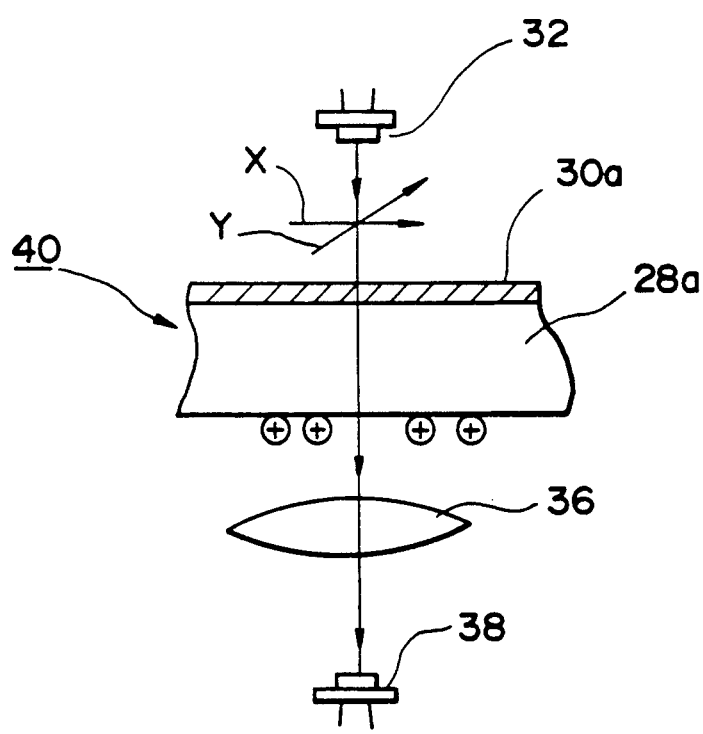
FIG. 3 is a side view showing a block diagram of a reproduction system in which a charge image is reproduced from a reproduction member to which the charge image is pretransferred according to the present invention.

FIG. 3 shows a reproduction system for reproducing a charge image from a reproduction member 40 in which the charge image is transferred from a master recording medium. The reproduction member 40 is composed by laminating a layer of transparent electrode 30a (a reading electrode) and a PML member 28a each other. The PML member 28a may be coated with a thin protective layer.

Figure 4:
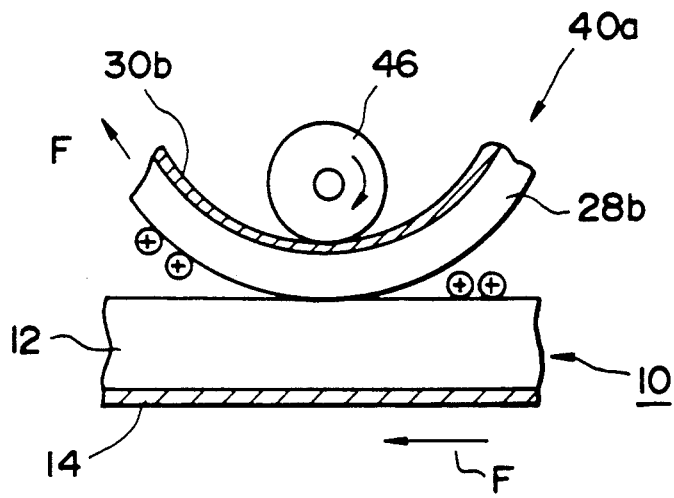
FIGS. 4 and 5 are side views showing a block diagram of a transfer system to transfer a charge image from a recording medium to a reproduction member, respectively according to the present invention.
Figure 5:
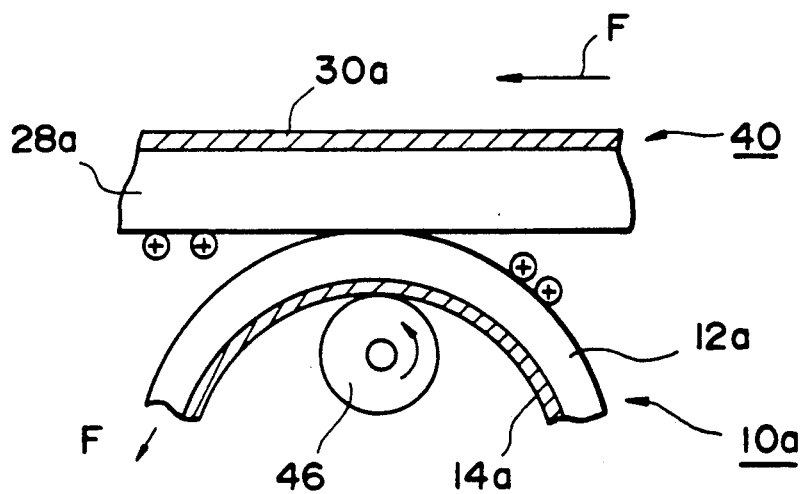

FIGS. 4 and 5 show charge image transfer systems respectively for transferring a charge image prerecorded in a recording medium which is used as a master, to the reproduction member 40. Such as the recording system shown in FIG. 2, which employs a laser beam intensity-modulated by signals carrying information to be recorded are applicable to record the information in a recording medium as the charge image with high resolution.

As for the recording medium, such as the followings may be applicable. Further the recording medium may be formed in a disk, tape, sheet or a card, etc.

(1). a recording medium 10 or 10a employing a polymer layer with high insulation resistance as the CHL member 12 or 12a as shown in FIG. 4 or 5.

Figure 6:
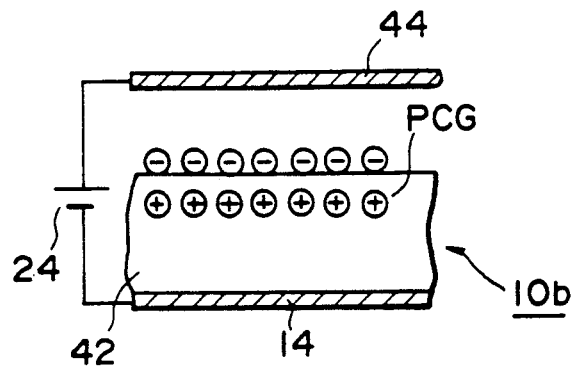
FIG. 6 is an explanatory view showing a recording medium in which the charge image is recorded according to the present invention.

(2). a recording medium 10b employing a dielectric layer (hereinafter abbreviated in an IL layer) member 42 in which a number of photoconductive fine particles PCG are dispersed separately from each other as shown in FIG. 6.

(3). a recording medium employing a laminated structure of a layer through which electric charges passes by applying an electric field and an additional layer capable of holding the electric charges, such as two-layer structure of a silicon oxide membrane and a silicon nitride membrane. and (4). a recording medium employing a switching layer as described in Japanese Patent Laid-Open No. 60(1985)-207151.

In FIG. 4 or 5, the charge image is preliminary formed on the CHL member 12 or 12a. Upon transferring the charge image from the CHL member 12 or 12a onto the PML member 28b or 28a of the reproduction member 40a or 40, the charge image preliminary formed on the CHL member 12 or 12a is destroyed due to a contact of the CHL member 12 or 12a and the PML member 28b or 28a with each other.

However, if the recording medium, described in (2) to (4) in which the charge image is formed inside of the respective layer thus it is reformable on its surface repeatedly, is employed, the charge image can be repeatedly transferred to the reproduction member 40a or 40 even if the charge image formed on the surface of the CHL member 12 or 12a is destroyed at each transfer.

FIG. 6 shows how a charge image formed inside of the recording medium 10b is called out to or reformed on the surface of the recording medium 10b.

Figure 2:
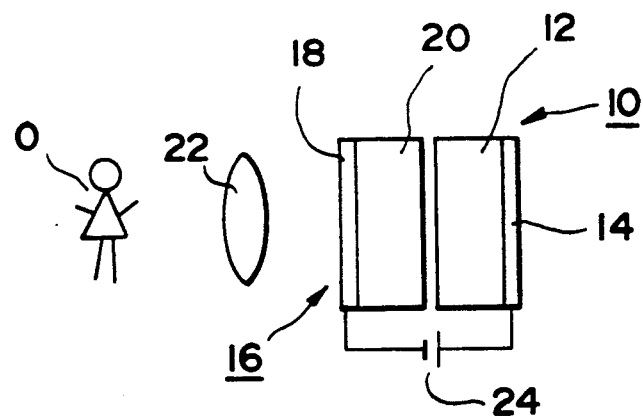
FIG. 2 is a block diagram showing a conventional recording system.

First, a charge image is formed on the surface of the recording medium 10b regarding to the process such as explained with FIG. 2 where the space discharge is used.

Next, a light with wavelength to which the fine particles PCG are sensitive, is radiated to the recording medium 10b to develop pairs of electron-holes of the fine particles PCG, this causes that the electrons or holes of the pairs are neutralized by the charges on the surface of the recording medium 10b and forms a charge image of the electrons or the holes left inside the IL layer 42.

Then, a voltage is applied across the transparent electrode 14 and an electrode 44 (an auxiliary electrode) from the d.c. power supply 24. Discharge occurs across the electrode 44 and the surface of the recording medium 10b to form electric charges thereon having reverse polarity of those recorded in the fine particles PCG in the form of separated electrons or holes. In this case, the transparent electrode 14 is not necessarily an integrated part of the recording medium 10b, but a separate electrode may be brought into the place of the transparent electrode 14. This results in the charge image formed on the surface of the recording medium 10b corresponding to that recorded within the IL member 42.

A corona charger may be used for the same purpose in place of the power supply 24 and the electrode 44 to provide charges of uniform polarity to the surface of the recording medium 10b.

The charge image thus formed on the surface of the recording medium 10b is transferred to a reproduction member by a transfer system such as shown in FIGS. 4 or 5.

The PML member 28b or 28a of the reproduction member 40a or 40 as shown in FIG. 4 or 5 may be composed of monocrystal of lithium niobate or liquid crystal. However, a layer of polymer-liquid crystal in which liquid crystal is dispersed in the polymer is further applicable for composing such reproduction member.

If the PML member 28b or 28a is compoed of the monocrystal of lithium niobate or twisted nematic liquid crystal, plane of polarization of an electro-magnetic radiation beam (light) passing therethrough varies accordingly with an electric field applied thereto. The light, plane of polarization of which is varying, emitted out from the reproduction member 40a or 40 is applied to an analyzer not shown to be converted to a light whose intensity is accordingly modulated.

On the other hand, if the PML member 28b or 28a is composed as scattering of light passing therethrough varies accordingly with an electric field applied thereto such as a layer of polymer-liquid crystal, intensity of an electro-magnetic radiation beam (light) passing through the PML member 28b or 28a is modulated accordingly with an electric field applied thereto. In this case, an analyzer, not shown, is not needed, which would otherwise convert the polar modulated light into an intensity modulated light.

There is provided a feed roller 46 in FIGS. 4 and 5, respectively for transfer the recording medium 10 or 10a and the reproduction member 40a or 40 at a same speed in the direction depicted by an arrow F. The surface of the recording medium 10 or 10a and the surface of PML member 28b or 28a (the surface of a thin protective layer if it is coated on the surface of PML member 28b or 28a) are made contact tight with each other at the position where the feed roller 46 touches the reproduction member 40a or recording medium 10a to transfer the charge image.

Only one roller 46 is provided in FIGS. 4 and 5 respectively, however, two rollers between which the recording medium and the reproduction member are pinched may also be provided.

The reproduction member 40a and the recording medium 10a shown in FIGS. 4 and 5 are flexible type, respectively.

In the transfer operation, the followings are applicable.

(1). The transparent electrode of the reproduction member and the electrode of the recording medium are short-circuited each other not to record external noise.

(2). A bias voltage may be applied across those electrodes with or without a space discharge caused therebetween to accelarate the transfer.

As is described above, in FIGS. 4 and 5, the charge image with high resolution formed on the surface of the recording medium can be transferred onto the surface of the reproduction member without a loss of the resolution.

After the charge image is transferred on the surface of the PML member (or thin protective layer) of the reproduction member, the PML member is adequately exposed to the electric field of the charge image transferred on the reproduction member.

The reproduction member 40 in FIG. 3 is in the state that the charge image is already transferred onto the surface of the PML member 28a (or on the thin protective layer). The PML member 28a is well subjected to electric field of the charge image, so that the plane of polarization of light passing therethrough is modulated according to the electric field. Accordingly, when a laser beam radiated from the laser source 32 and deflected in the directions depicted by the arrows X and Y by an optical system or deflection system not shown passes through the reproduction member 40, the plane of polarization of the laser beam is modulated accordingly with the charge image recorded in the reproduction member 40.

Then, when the laser beam thus passing through the reproduction member 40 is applied to the analyzer 34 and the photoelectric convertor 38 through the lens 36 such as shown in FIG. 1, the photoelectric convertor 38 produces electric signals corresponding to the charge image transferred to the reproduction member 40.

On the other hand, if scattering of the laser beam thus passing through the reproduction member 40 varies due to the electric field of the charge image, the laser beam can be applied to the photoelectric convertor 38 without the analyzer 34. Then, the photoelectric convertor 38 produces electric signals corresponding to the charge image transferred to the reproduction member 40.

In FIG. 3, an electrode having a function of a reflection layer may be provided instead of the transparent electrode 30a. In this case, a light for reproduction is incident to the PML member 28a at an opposite surface thereof to that laminated to that electrode. After passing therethrough, the light is reflected at the reflection layer and emitted out from the same surface to which the light is incident.

Figures 7, 8:
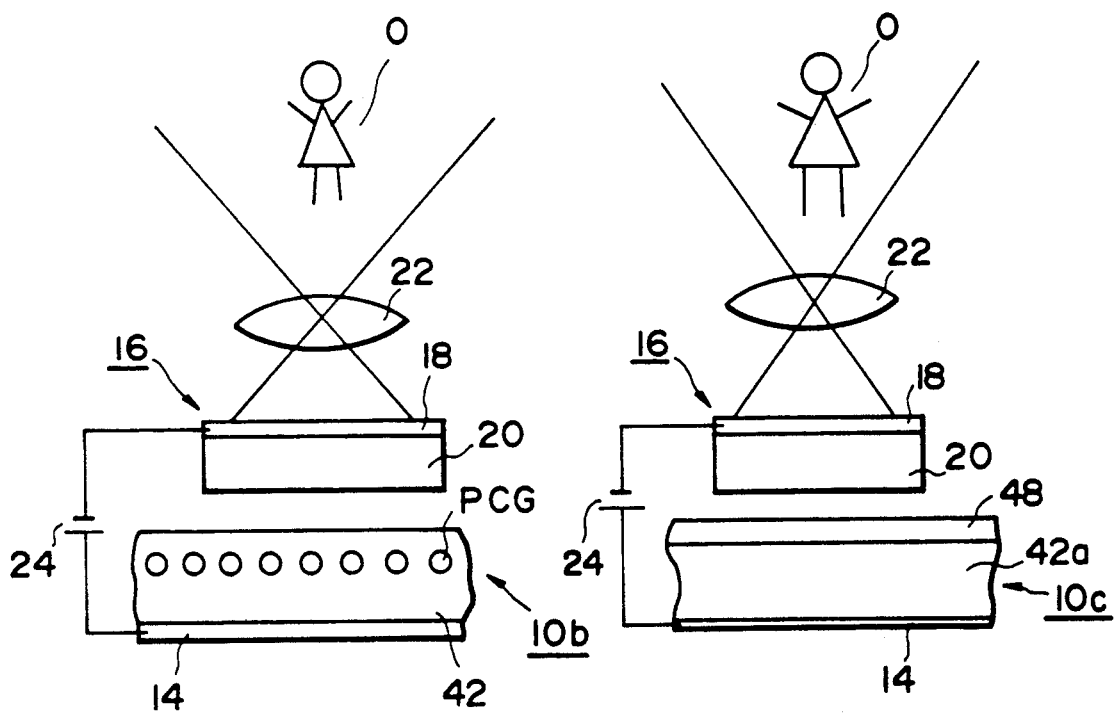
FIGS. 7 to 11 are side views showing a transfer system of a charge image, respectively according to the present invention.

FIGS. 7 and 8 show recording system for recording information in a recording medium having memory function in that a charge image can be held respectively.

The recording medium 10b in FIG. 7 is composed as the electrode 14 is laminated on the IL member 42 having a layer of fine particles PCG therein as described before.

The IL member 42 is composed of a dielectric material with a high insulation resistance. The fine particle PCG layer is formed in such a manner that a numeral photoconductive fine particles PCG are distributed evenly and separately from each other on the IL member 42 by a suitable means, and thereafter, a thin layer of dielectric material is deposited over the distributed PCGs, such as by means of vapor deposition or sputtering. In order to separately distribute the fine particles PCG, photoconductive material may be vapor-deposited or sputtered using a mask pattern.

A recording medium 10c in FIG. 8 is composed by laminating a charge transfer suppressing layer (herein after abbreviated in an ESL) member 48, an IL member 42a and the electrode 14 each other.

The ESL member 48 is composed of a thin dielectric layer such as a thin layer of silicon dioxide and alumina which allows a current to flow therethrough due to the tunnel effect when a large electric field is applied thereto.

The recording medium 10b and 10c are composed by laminating each layer on the IL member 42 or 42a by such as vapor deposition or sputtering.

In the recording system as shown in FIG. 7, the electrode 14 is attached to a surface of the IL member 42. The other surface thereof faces the PCL member 20 of the writing head 16 across a minute gap.

A charge image is formed on the IL member 42 in the same manner as described with reference to FIG. 2. Discharge then occurs across the gap accordingly with the optical image to form a negative charge image corresponding to optical image on the IL member 42.

When a light radiated from a light source not shown is incident to the IL member 42, pairs of electron-hole are generated in the fine particles PCG. Due to an electric field developed across the pairs and the negative charge formed on the IL member 42, the negative charges move through the IL member 42 to reach the fine particles PCG as a tunnel current.

The tunnel current corresponding to the negative charge image is neutralized with the holes of the pairs to make the fine particles PCG being negatively charged. This results in the charge image corresponding to the optical image of the object O being recorded by the fine particles PCG.

Next in FIG. 8, a charge image is formed on the IL member 42a also in the same manner as described with reference to FIG. 2. Discharge then occurs across the gap formed between the PCL member 20 and the ESL member 48 accordingly with the optical image to form a charge image corresponding to the optical image on the IL member 42a.

An intense electric field is applied across the surface of the ESL member 48 and the electrode 14 due to the charge image formed on the IL member 42a. Electric charges that is electrons of the charge image flow through the ESL member 48 as a tunnel current due to the tunnel effect. This results in the charge image corresponding to the optical image of the object O being recorded in the vicinity of the border of the ESL member 48 and the IL member 42a.

Figure 9:
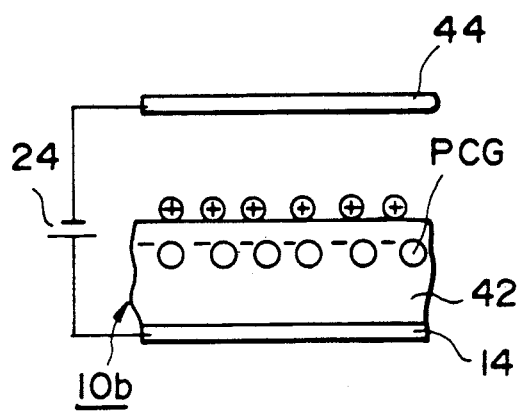
Figure 10:
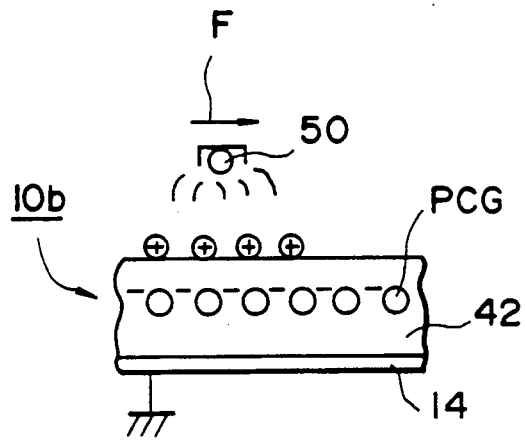

The charge image corresponding to the charge image thus recorded in the recording medium 10b or 10c is recorded on the surface thereof in the manner with reference to FIGS. 9 and 10.

In FIG. 9, a voltage is applied across the electrodes 14 and 44 to cause discharge to apply electric charges on the surface of the recording medium 10b.

In FIG. 10, a corona electrical charger 50 provided as facing the recording medium 10b is transferred in the direction depicted by an arrow F to apply electric charges on the surface of the recording medium 10b.

Figure 11:
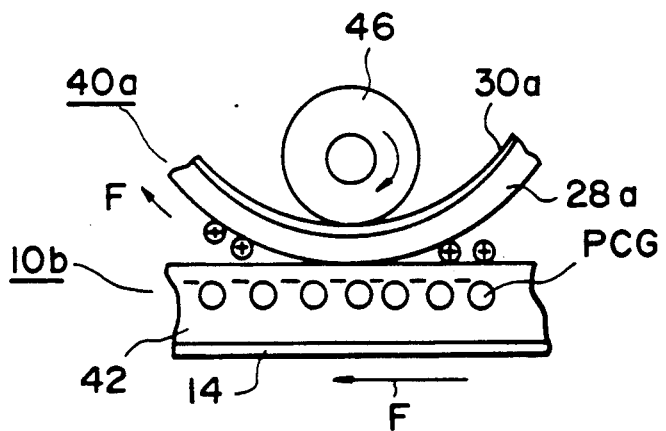

The charge image thus recorded on the recording medium 10b is transferred onto the PML member 28a of the reproduction member 40a as shown in FIG. 11.

Namely, the charge image corresponding to the information to be recorded is recorded in the recording medium 10b in FIG. 7. Next, the charge image corresponding to that thus recorded in the recording medium 10b is formed on the surface thereof in FIGS. 9 or 10. Finally, the charge image thus formed is transferred onto the PML member 28a of the reproduction member 40a as shown in FIG. 11.

The recording medium 10b shown in FIG. 11 is the one shown in FIG. 7. However, transfer operation for the recording medium 10c shown in FIG. 8 is the same.

The feed roller 46 works in the same manner as shown in FIGS. 4 and 5. Two processes (1) and (2) for the transfer operation with reference to FIGS. 4 and 5 are also applied to FIG. 11.

A gap may be provided between the reproduction member 40a and the recording medium 10b in FIG. 11 to cause a space discharge therethrough in the transfer operation.

Figure 12:
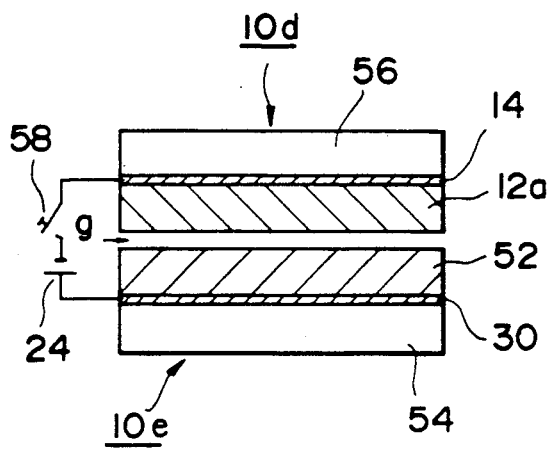
FIGS. 12 and 13 are views showing the principle of a transfer system of a charge image, respectively according to the present invention.
Figure 13:
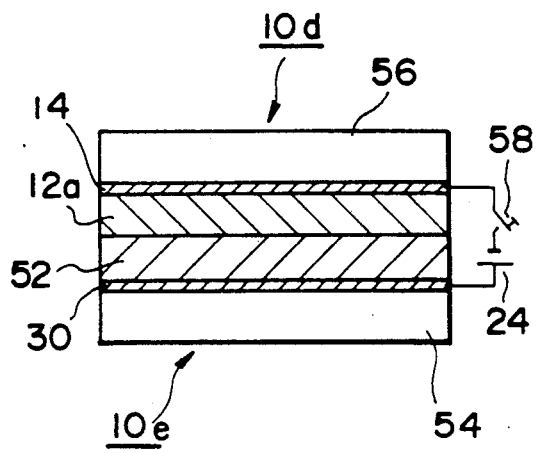

Next, FIGS. 12 and 13 show transfer systems from which a feed roller is eliminated. A recording medium 10d is composed by laminating in succession a recording layer 12a, the electrode 14 and a supporting member 56. On the other hand, a reproduction member 10e is composed by laminating in succession a memory layer 52 of polymer and liquid crystal, the electrode 30 and a supporting member 54.

In FIG. 12, both the recording medium 10d and the reproduction member 10e in which liquid crystal is dispersed in lithium niobate or polymer and which has memory function face with each other through a gap g. The d.c. power supply 24 and a switch 58 are connected across the electrodes 14 and 30 in series.

A voltage $V_0$ is applied thereacross by turning on the switch 58 to transfer the information which optically varies accordingly with the charge image recorded in the recording medium 10d to the reproduction member 10e.

Figure 14:
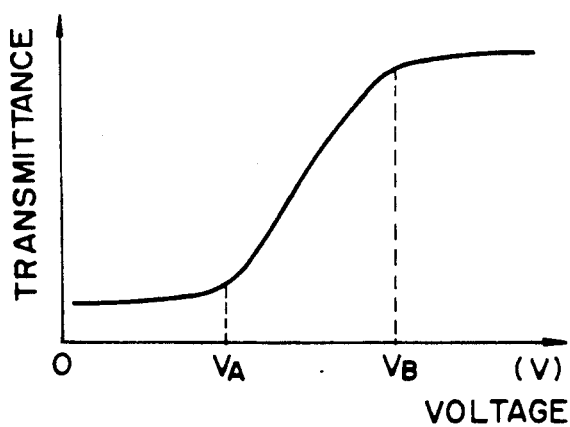
FIG. 14 is a curve of applied voltage to transmittance-characteristic of a conventional memory layer of polymer and liquid crystal.

FIG. 14 shows transmittance to applied voltage characteristics of the memory layer 52. There is a threshold voltage $V_A$, so that the transmittance does not respond if a voltage below the voltage $V_A$ is applied thereto.

Accordingly, the voltage $V_0$ is arranged so that an electric field of more than the voltage $V_A$ is applied to the reproduction member 10e from the charge image recorded in the recording medium 10d. The charge image on the recording medium 10d is to cause modulation of the electric field subjecting the reproduction member 10e, but charges of the charge image do not transfer to the reproduction member 10e. The d.c. power supply 24 may be eliminated from the system if the charge image has a bias potential equivalent to the $V_0$.

In FIG. 13, both the recording medium 10d and the reproduction member 10e face each other in which the recording layer 12a and the memory layer 52 are in tight contact each other.

Figure 15:
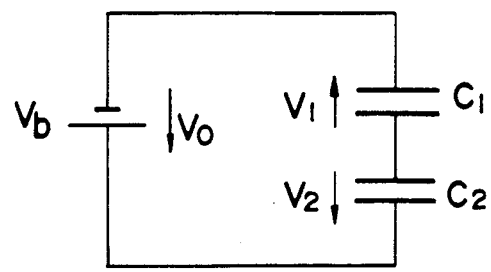
FIG. 15 shows an equivalent circuit of the system shown in FIG. 13.

FIG. 15 shows an equivalent circuit of the system shown in FIG. 13 where $C_1$ and $C_2$ are electrostatic capacity of the recording medium 10d and the reproduction member 10e and $V_1$ and $V_2$ the voltages generated in the recording layer 12a and the memory layer 52, respectively.

According FIG. 14, the transmittance to applied to voltage-characteristics of the memory layer 52 is almost linear between the threshold voltage $V_A$ and the saturation voltage $V_B$ and almost flat up to the voltage $V_A$ and over the voltage $V_B$.

Therefore, if the electric potential of the charge image recorded in the recording medium 10d is in the range of 0 to $V_1$, the voltage $V_0$ and $V_1$ must satisfy the following conditions.

$$V_A = C_1 V_0/(C_1 + C_2) \tag{1}$$

$$V_B - V_A \geq C_1 V_1/(C_1 + C_2) \tag{2}$$

where $C_1/(C_1 + C_2) \approx 1$ that is $C_1 \gg C_2$.

If the conditions are satisfied, the charge image on the recording medium 10d is not destroyed after the transfer so that a plurality of duplicate reproduction members can be obtained from the same recording medium 10d.

What is described above is the case that there is no discharge or current flow (no transfer of electric charges) occurred across the gap g. However, transfer operation with the discharge is also possible. The conditions (1) and (2) also must be satisfied. A plurality of duplicate reproduction members can be obtained by setting $C_1 > C_2$.

Figure 16:
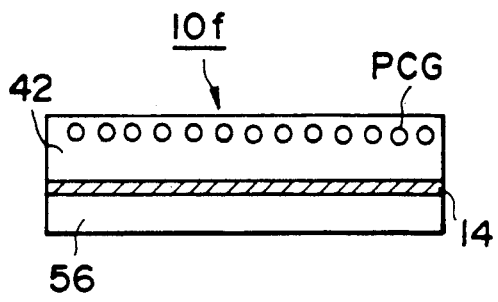
FIG. 16 is an enlarged side view, partly in cross section of a recording medium according to the present invention.

The recording medium 10d shown in FIG. 12 is such as a recording medium 10f shown in FIG. 16 in which photoconductive fine particles PCG are dispersed in the IL member 42 so as to have memory function.

Transfer operation of a charge image using the recording medium described above will be explained.

Figure 17:
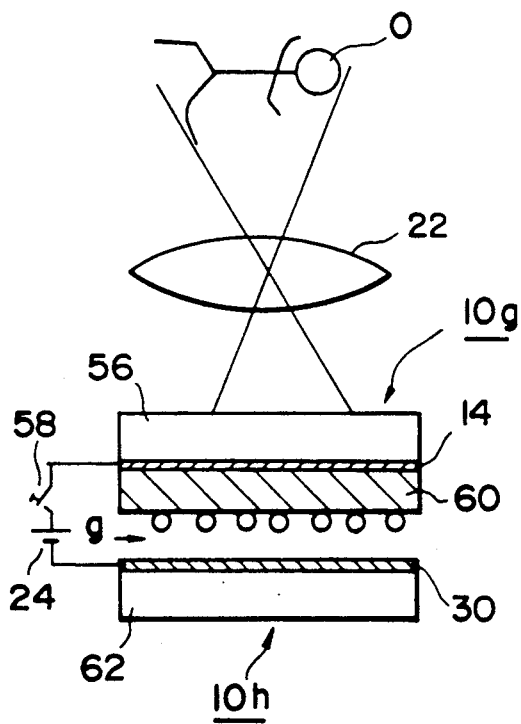
FIG. 17 is a view showing the principle of forming a charge image on a photoconductive layer member according to the present invention.

First, in FIG. 17, a light carrying an optical image of an object is projected onto a PCL member 60 with a voltage applied thereto through an imaging lens 22 to form a charge image on the PCL member 60.

Figure 18:
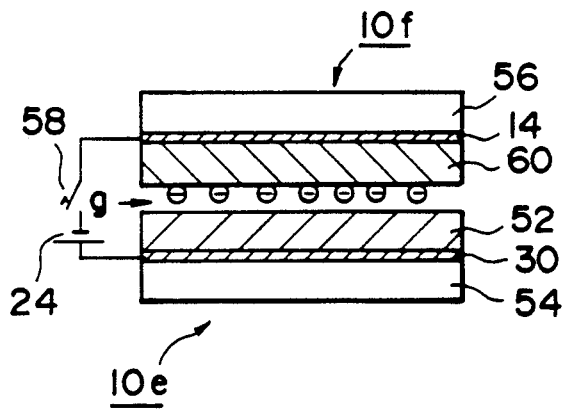
FIG. 18 is a view showing the principle of transferring information corresponding to a charge image from a recording medium to another, respectively according to the present invention.

Then, as shown in FIG. 18, the memory and reproduction layer 52 is arranged to face the PCL member 60 with a gap g and a voltage is applied thereacross or both are in tight contact each other to press and transfer them by a feed roller not shown with a voltage is applied thereacross to transfer the information as the charge image to the reproduction member 10e. It is needless to say that the voltage produced by the d.c. power supply 24 satify the conditions (1) and (2).

Figure 19:
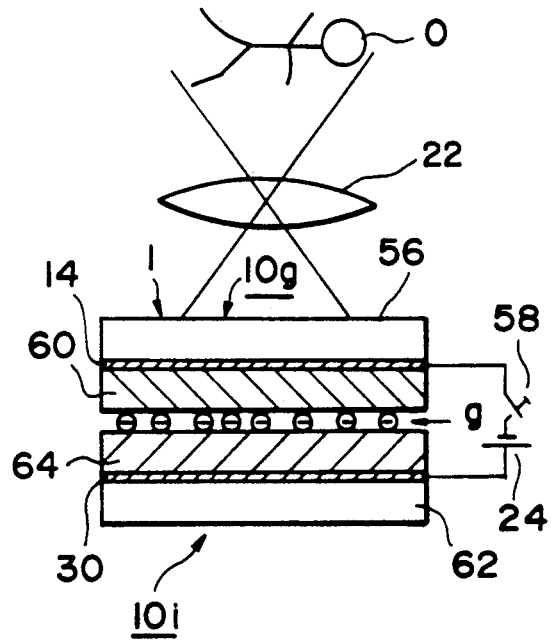
FIG. 19 is a view showing a charge image recording system according to the present invention.
Figure 20:
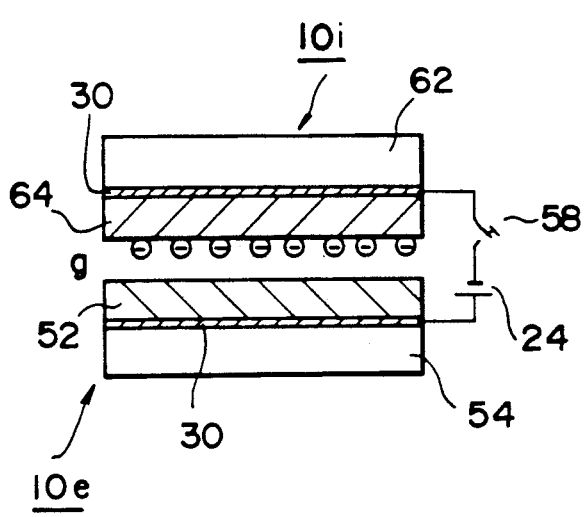
FIGS. 20 and 21 are views showing the principle of forming and transferring a charge image, respectively according to the present invention.
Figure 21:
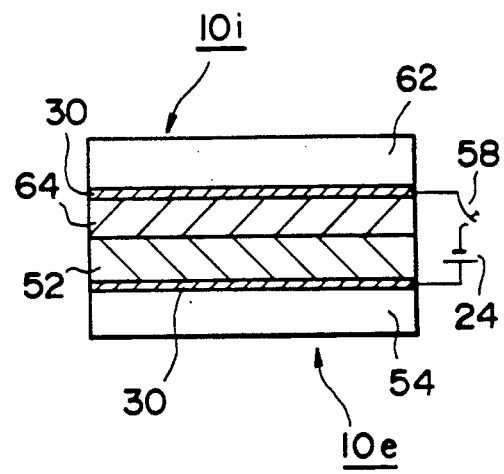

In FIG. 19, a light carrying an optical image of an object is projected onto a PCL member 60 through the imaging lens 22 to form a charge image on an IL member 64 with a voltage applied across electrodes 14 and 30. Then as shown in FIGS. 20 and 21, the charge image is transferred to the memory layer 52.

Figure 22:
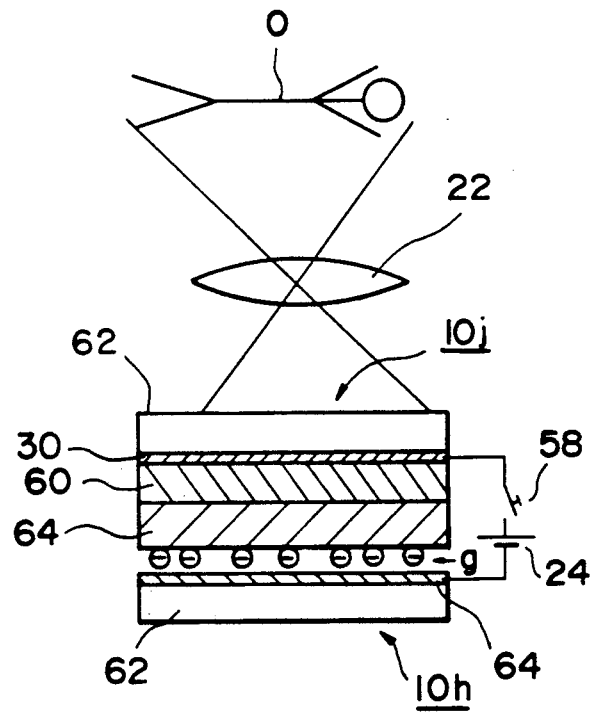
FIG. 22 is a view showing the principle of a charge image recording system according to the present invention.

In FIG. 22, a light carrying an optical image of an object is projected onto a PCL member 60 of a recording medium 10j to form a charge image thereon. Then the charge image is transferred to the memory layer 52 in FIG. 20 or 21.

The electro-magnetic radiation beam used for reproducing the information with high resolution which is transferred to the reproduction member from the recording medium may be made in a line beam, a fan beam or a spot beam.

The method for recording/reproducing a charge image according to the present invention is applicable not only for an image data but also for a time sequential information such as digital data. In this case, a charge image corresponding to the information to be recorded is formed in a recording medium by modulating a laser beam and the charge image is transferred to a reproduction member.

Furthermore, the reproduction member to which the charge image is transferred is employed not only for signal reproduction but also as such as a printing-plate for a printer and the information source for displaying.

As is described above, according to the present invention, a charge image prerecorded in a recording medium is once transferred to a reproduction member including a photo-modulation layer member. Then, an electro-magnetic radiation beam is radiated onto the reproduction member to reproduce the charge image. Therefore, a reproduction signal with high resolution can be obtained.

Furthermore, the recording medium has memory function so that a large number of duplicated reproduction members can be produced without destroying the prerecorded charge image stored as a master.

What is claimed is:

1. A method for recording/reproducing a charge image, comprising the steps of:
    preparing a master recording medium including a charge holding member and an electrode;
    focusing optical information onto the master recording medium, thus to form a charge image in accordance with the optical information, in the charge holding member;
    preparing a reproduction member including an electrode and a photo-modulation member;
    arranging the master recording medium and the reproduction member such that the surfaces of the charge holding member in which the charge image is formed and the photo-modulation member face each other;
    transferring the charge image formed in the charge holding member onto the surface of the photo-modulation member; and
    projecting a reading light onto the photo-modulation member to which the charge image is transferred, so as to apply photo-modulation corresponding to the charge image, to the reading light, thus to reproduce the charge image as the optical information.

2. The method of claim 1, wherein the master recording medium preparing step includes the step of employing a photoconductive layer as the charge holding member.

3. The method of claim 1, wherein the focusing step includes the steps of:
    preparing a recording head including a transparent electrode and a photoconductive layer laminated to each other;
    arranging the master recording medium and the recording head such that the charge holding member and the photoconductive member face each other; and
    applying an electric field across the electrode of the master recording medium and the transparent electrode and simultaneously focusing the optical information onto the photoconductive layer of the recording head, thus to form the charge image in accordance with the optical information, in the charge holding member of the master recording medium.

4. The method of claim 1, wherein the arranging step includes the step of contacting the surfaces of the charge holding member and the photo-modulation member with each other.

5. The method of claim 1, wherein the arranging step includes the step of applying potential difference across the electrodes of the master recording medium and the reproduction member.

6. The method of claim 4, wherein the transferring step includes the step of connecting the electrodes of the master recording medium and the reproduction member.

7. The method of claim 1, wherein the reproduction member preparing step includes the step of employing a member containing lithium niobate as the photo-modulation member.

8. The method of claim 1, wherein the reproduction member preparing step includes the step of employing a member containing liquid crystal as the photo-modulation member.

9. The method of claim 1, wherein the reproduction member preparing step includes the step of employing a member containing polymer-dispersed liquid crystal as the photo-modulation member.

10. The method of claim 1, wherein the master recording medium preparing step includes the step of employing a dielectric material in which photoconductive fine particles are distributed as the charge holding member.

* * * * *